Patented Sept. 10, 1929.

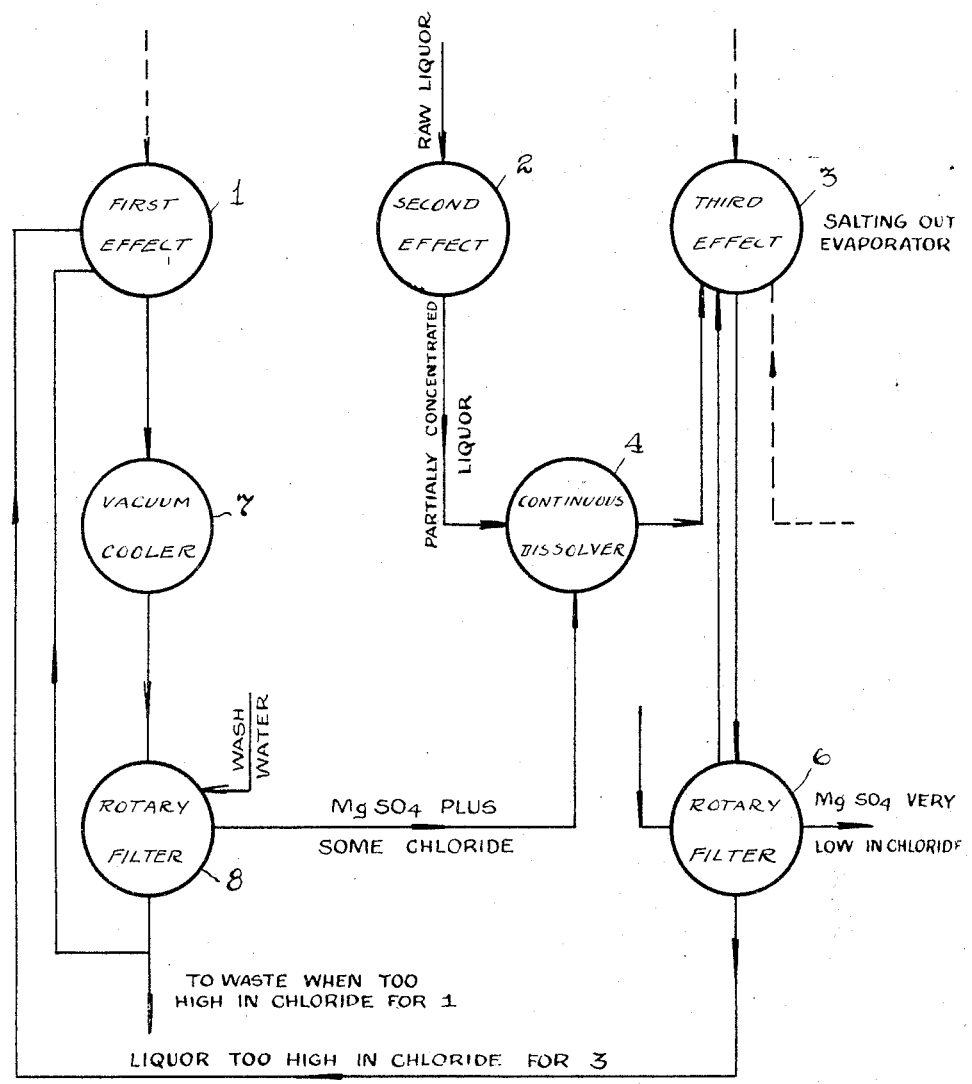

1,727,597

UNITED STATES PATENT OFFICE.

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN.

METHOD OF PURIFYING MAGNESIUM SULPHATE SOLUTIONS.

Application filed September 1, 1926. Serial No. 132,918.

This invention relates to the manufacture of Epsom salt, and more particularly the treatment of solutions containing magnesium sulphate together with impurities, such as chlorides of sodium and magnesium, and it is among the objects of the invention to provide improved procedure for separating out such impurities and retaining the magnesium sulphate in a desired form. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail but one of various ways in which the principle of the invention may be used.

The said annexed drawing represents in diagrammatical form as a flow sheet one embodiment of the invention.

In carrying out the invention I may proceed, for example, as follows:

The solution containing magnesium sulphate and chlorides of sodium and of alkaline earths is supplied at a gravity of about 28° Bé. to an intermediate pan 2 of a multiple effect evaporating system, the temperature at which point may be about 60° C. with a gage vacuum of about 24.9″. From this, discharge of the partially concentrated liquor is had to a dissolving tank 4, preferably a continuous dissolver, which is also fed with crystals of magnesium sulphate with chlorides, provided by filter 8 working in connection with the first evaporating pan 1 of the series. From the dissolving tank 4, the liquor is passed to the third effect salting out pan 3, which may be maintained at about 40° C. at a vacuum of 28.30″. Discharge of the thick crystal slurry from this in turn goes to a filter 6, preferably of rotary type, and the crystals of magnesium sulphate low in chloride here separated out may be dried and packed, or fed to a final recrystallization for finishing, while the mother liquor is cycled back to pan 3 until it runs up an undesirable concentration of chlorides, e. g., one pound of chlorides to about sixty-two of magnesium sulphate, whereupon it is turned back to pan 1. Pan 1 may operate at about 80° C. with a vacuum of around 18″, and discharges a crystal slurry to a vacuum cooler 7 where it is cooled for instance to about 40° C., thence to a filter 8, again preferably of rotary type. Chloride-containing mother liquor may be further removed by applying wash water to the crystals on the filter. From the latter the salts are passed to the dissolver 4, as previously indicated, while the mother liquor is cycled back to pan 1 until it runs up a concentration favoring formation of the double salt sulphate of sodium and magnesium, whereupon it is withdrawn from the system.

The particular temperatures at which the various pans are run may differ from the illustrative figures given, and feed of fresh liquor may be arranged for other pans, and in continuous or batch procedure as preferred, but in any case it will thus be seen that the magnesium sulphate is progressively freed from contaminating chloride, while the mother liquor is cycled in stages until concentration of chloride reaches a predetermined point.

Other modes of applying the principle of the invention may be employed, change being made as regards the features disclosed, providing the steps stated in any of the following claims or the equivalent of such be used.

I therefore particularly point out and distinctly claim as my invention:—

1. A method of separating magnesium sulphate from a solution thereof containing contaminating chlorides, which comprises concentrating such solution in multiple effect under reduced pressure, separating out magnesium sulphate crystals, passing the mother liquor so separated in one effect to another operating at higher temperature, redissolving the crystals obtained from a high temperature effect, and removing the crystals separated in said lower temperature effect.

2. A method of separating magnesium sulphate from a solution thereof containing contaminating chlorides, which comprises concentrating such solution at reduced pressure in more than one stage in multiple effect, dissolving crystals high in chloride obtained in one effect in a solution obtained from another effect operating at a relatively lower temperature, further concentrating the resulting solution, and removing crystals therefrom lower in impurities, while cycling the mother liquors in the effects.

3. A method of separating magnesium sulphate from a solution thereof containing chloride impurities of sodium and magnesium, which comprises conducting evaporation to concentrate a solution at reduced pressure in multiple effects, cooling concentrated liquor from the high temperature effect to produce magnesium sulphate crystals in high chloride mother liquor, separating such crystals from the mother liquor, redissolving the crystals, concentrating the solution in an effect at lower temperature to form crystals of magnesium sulphate in a mother liquor of relatively lower chloride content, separating the crystals so formed, recycling the mother liquors, adding raw liquor to the lower temperature effect through an intermediate effect wherein it is partially concentrated, forwarding excess mother liquor from the lower temperature effect to the high temperature effect, and eliminating high chloride residual mother liquor from crystals formed by cooling the concentrated liquor from the high temperature effect.

4. A method of separating Epsom salt crystals from a solution thereof containing chloride impurities, which comprises conducting concentration in three effects under reduced pressure, feeding the raw liquor to the intermediate effect wherein it is partially concentrated, cooling the solution concentrated in the high temperature effect to produce a mixture of high chloride mother liquor and Epsom crystals, separating the crystals so formed, redissolving the crystals in partially concentrated liquor from the intermediate effect, continuing concentration of the solution so obtained in the low temperature effect to produce crystals of Epsom salt in a mother liquor containing a relatively small amount of chloride impurities, removing such crystals, recycling mother liquor separated from crystals in the low temperature and high temperature effects respectively, forwarding excess mother liquor from the low temperature effect to the high temperature effect, and eliminating residual mother liquor from the high temperature effect.

5. A method of separating Epsom salt from a solution thereof containing chloride impurities, which comprises conducting evaporation to concentrate such solution in a plurality of stages at different temperatures, separating and dissolving crystals of Epsom salt high in chloride derived from a high temperature stage of concentration in solution to be concentrated in a relatively lower stage, recrystallizing therefrom Epsom salt of higher purity in mother liquor containing relatively less impurity, while recycling mother liquor in the high temperature and low temperature stages, introducing raw liquor into the low temperature stage, forwarding mother liquor from the low temperature stage to the higher temperature stage and eliminating high chloride mother liquor from the high temperature stage.

6. A method of separating crystalline Epsom salt from a solution thereof containing crystallizable chloride impurities by fractional crystallization, which comprises concentrating the solution at reduced pressure in a plurality of stages at different temperatures, dissolving crystals produced from concentrated high chloride mother liquor in one stage, and reconcentrating the solution at another stage at a relatively lower temperature to separate crystals of Epsom salt therefrom.

Signed by me this 20th day of August, 1926.

SHELDON B. HEATH.